(12) United States Patent
Kulkarni et al.

(10) Patent No.: US 7,082,451 B2
(45) Date of Patent: Jul. 25, 2006

(54) RECONFIGURABLE VECTOR-FFT/IFFT, VECTOR-MULTIPLIER/DIVIDER

(75) Inventors: Satish S. Kulkarni, Austin, TX (US); Brian T. Kelley, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 671 days.

(21) Appl. No.: 10/237,465

(22) Filed: Sep. 9, 2002

(65) Prior Publication Data

US 2004/0064493 A1   Apr. 1, 2004

(51) Int. Cl.
*G06F 15/00* (2006.01)

(52) U.S. Cl. .................................... 708/404
(58) Field of Classification Search ............ 708/404, 708/442, 230
See application file for complete search history.

(56) References Cited

U.S. PATENT DOCUMENTS

| | | | | |
|---|---|---|---|---|
| 4,231,102 A | | 10/1980 | Barr et al. ................... | 364/726 |
| 4,737,930 A | * | 4/1988 | Constant ..................... | 708/835 |
| 4,811,210 A | * | 3/1989 | McAulay ..................... | 708/816 |
| 4,896,287 A | | 1/1990 | O'Donnell et al. ......... | 364/754 |
| 6,003,056 A | * | 12/1999 | Auslander et al. .......... | 708/404 |
| 6,608,863 B1 | * | 8/2003 | Onizawa et al. ............ | 375/232 |
| 6,643,678 B1 | * | 11/2003 | Van Wechel et al. ....... | 708/530 |
| 6,691,144 B1 | * | 2/2004 | Becker ........................ | 708/622 |
| 6,778,591 B1 | * | 8/2004 | Sato ............................ | 375/147 |
| 6,836,839 B1 | * | 12/2004 | Master et al. ............... | 712/29 |
| 6,874,006 B1 | * | 3/2005 | Fu et al. ..................... | 708/442 |
| 2004/0103265 A1 | * | 5/2004 | Smith ......................... | 712/15 |

OTHER PUBLICATIONS

Arguello et al., "Parallel architecture for fast transforms with trigonometric kernel," IEEE Trans. On Parallel and Distributed Systems, vol. 5, No. 10, Oct. 1994.

Despain, A.M. "Fourier transform computers using CORDIC iterations," IEEE Trans. On Computers, vol. c-23, No. 10, Oct. 1974.

Despain, A.M. "Very fast fourier transform algorithms hardware for implementation," IEEE Trans. On Computers, vol. c-28, No. 5, May 1979.

Jarvis, P., "Implementing Cordic Algorithms," Dr. Dobbs Journal, Oct. 1990.

(Continued)

*Primary Examiner*—Tan V. Mai
(74) *Attorney, Agent, or Firm*—Fulbright & Jaworski LLP

(57) ABSTRACT

Systems and methods are described for providing a reconfigurable circuit having multiple distinct circuit configurations with respective distinct operating modes The circuit may be controllably configures to perform a fast Fourier transform function, a multiplier function, and a divider function. In one exemplary practical application of the invention, the fast Fourier transform function, multiplier function, and divider function may be used for signal demodulation, channel equalization and channel estimation for a WLAN IEEE 802.11 system.

13 Claims, 12 Drawing Sheets

OTHER PUBLICATIONS

Samiento, R. and Eshraghian K., "Implementation of a CORDIC processor for CFFT computation in gallium arsenide technology," IEEE Computer Society Press, EUROASIC—The European Event in ASIC Design, Paris, France, Proceedings, Feb. 28-Mar. 3, 1994.

Sarmiento et al., "A CORDIC processor for FFT computation and its implementation using gallium arsenide technology," IEEE Trans. On VLSI Systems, vol. 6, No. 1, Mar. 1998.

Wang, S. and Swartzlander, Jr., E., "Merged CORDIC Algorithm," IEEE International Symposium on Circuits and Systems, ISCAS, Seattle, Washington, USA, Apr. 30-May 3, vol. 3, 1995.

Walther, J.S., "A unified algorithm for elementary functions," AFIPS Conference Proceedings, Atlantic City, New Jersey, vol. 38, 1971.

Xiaobi et al., "Design CORDIC-based systems using term rewriting techniques," Midwest Symposium on Circuits and Systems, Proceedings, 1998.

* cited by examiner

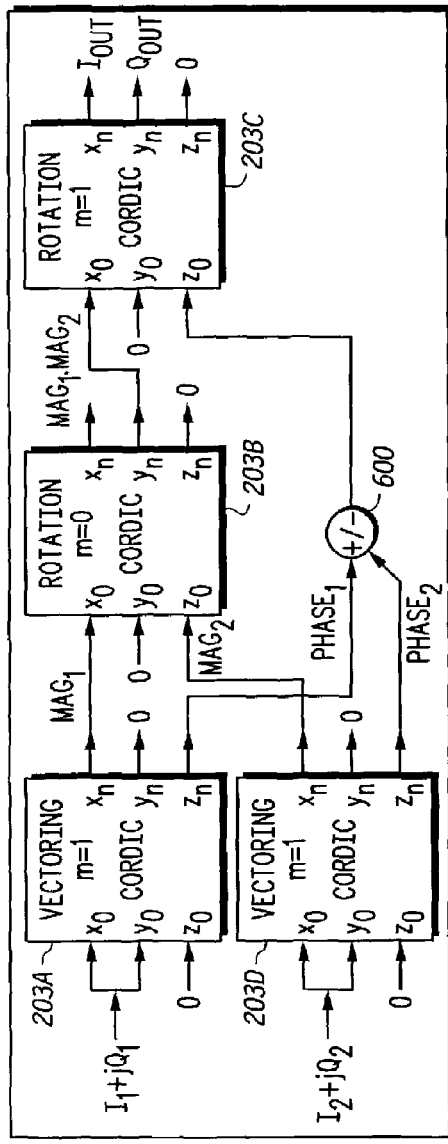
*FIG.6*
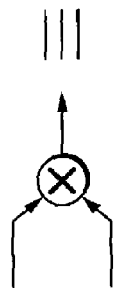
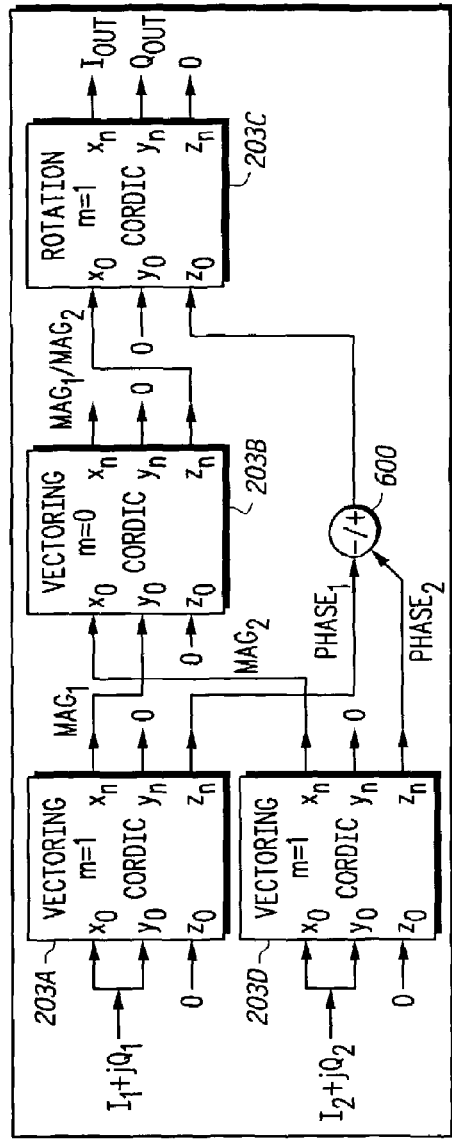
*FIG.7*
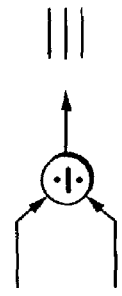

RECONFIGURABLE VECTOR-FFT/IFFT, VECTOR-MULTIPLIER/DIVIDER

BACKGROUND OF THE INVENTION

1. Field of the Invention

The invention relates generally to the signal processing, and more particularly to signal processing in wireless communications.

2. Discussion of the Related Art

Wireless Local Area Network (WLAN) technology based upon Orthogonal Frequency Division Multiplexing (OFDM) is increasingly gaining in popularity due to very high spectral efficiency and extremely high data rates (e.g. 54 Mbits/second for IEEE 802.11a). The physical layer for OFDM-WLAN systems requires the implementation of FFTs (Fast Fourier Transform) for demodulation, complex division of the OFDM symbol for nominal channel estimation, and complex multiplication for channel equalization and pilot phase correction, all of which must be performed at high speed. The implementation of FFTs and vector-based complex operations necessitates very high computational throughput for the modem signal processing. However, the desire to implement systems with minimal cost, size, and power for VLSI implementation is constraining the performance capabilities.

One example of this is shown in a current system (FIGS. 1A and 1B) which requires data 103, 104 to be inputted into and outputted 104, 105 from two distinct processing stages 100, 101. As shown in FIG. 1B, this implementation requires two storage registers 106, 107, an adder/subtractor module 114, a multiplier module 113, two multiplexers 111, 112, and two counters 108, 109 in a processing stage. The storage registers 106, 107 combined may store the elements of a matrix as each is computed. The need for each of these hardware components and others necessary to tailor the system to a specific need keeps the hardware from becoming smaller in size without at the same time reducing computational power. Also, the need to keep the system small enough for a VLSI implementation prevents existing systems from being able to process a large number of operands.

SUMMARY OF THE INVENTION

There is a need for the following embodiments. Of course, the invention is not limited to these embodiments.

According to an aspect of the invention, a method comprises: providing a reconfigurable circuit having multiple distinct circuit configurations with respective distinct operating modes, configuring the reconfigurable circuit in a first configuration to perform a fast Fourier transform function, configuring the reconfigurable circuit in a second configuration to perform a multiplier function, and configuring the reconfigurable circuit in a third configuration to perform a divider function. The fast Fourier transform function, multiplier function, and divider function may be used for signal demodulation, channel equalization and channel estimation for a WLAN IEEE 802.11 system.

According to another aspect of the invention, an apparatus comprises a reconfigurable mathematical operation circuit having a plurality of reconfigurable components for performing a respective plurality of distinct mathematical functions; and a controller for controlling a configuration of the circuit so that, in a first configuration the circuit performs a fast Fourier transform function, in a second configuration the circuit performs a multiplier function, and in a third configuration said circuit performs a divider function. The individual reconfigurable components may be a plurality of CORDIC circuits.

In an exemplary embodiment, the reconfigurable mathematical operation circuit forms a reconfigurable WLAN IEEE 802.11 receiver circuit including WLAN signal demodulation, channel estimation and channel equalization functions.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein like reference numerals (if they occur in more than one view) designate the same elements. The invention may be better understood by reference to one or more of these drawings in combination with the description presented herein. It should be noted that the features illustrated in the drawings are not necessarily drawn to scale.

FIG. 6 is a reconfigurable operation kernel for complex multiplication using a CORDIC engine, in accordance with an embodiment of the invention.

FIG. 7 is a reconfigurable operation kernel for complex division using a CORDIC engine, in accordance with an embodiment of the invention.

DETAILED DESCRIPTION

Figure 1A:
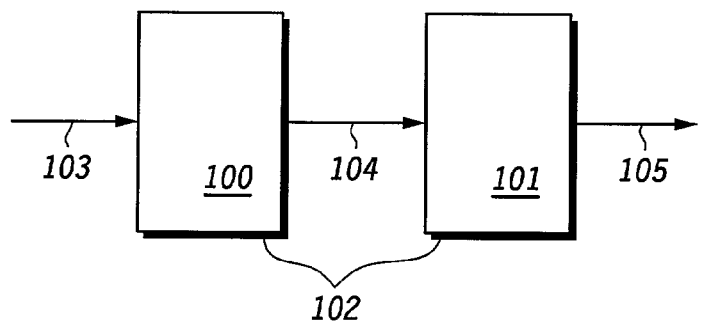
FIG. 1A is a logic diagram of a prior art system for computing a Fourier transform.
Figure 1B:
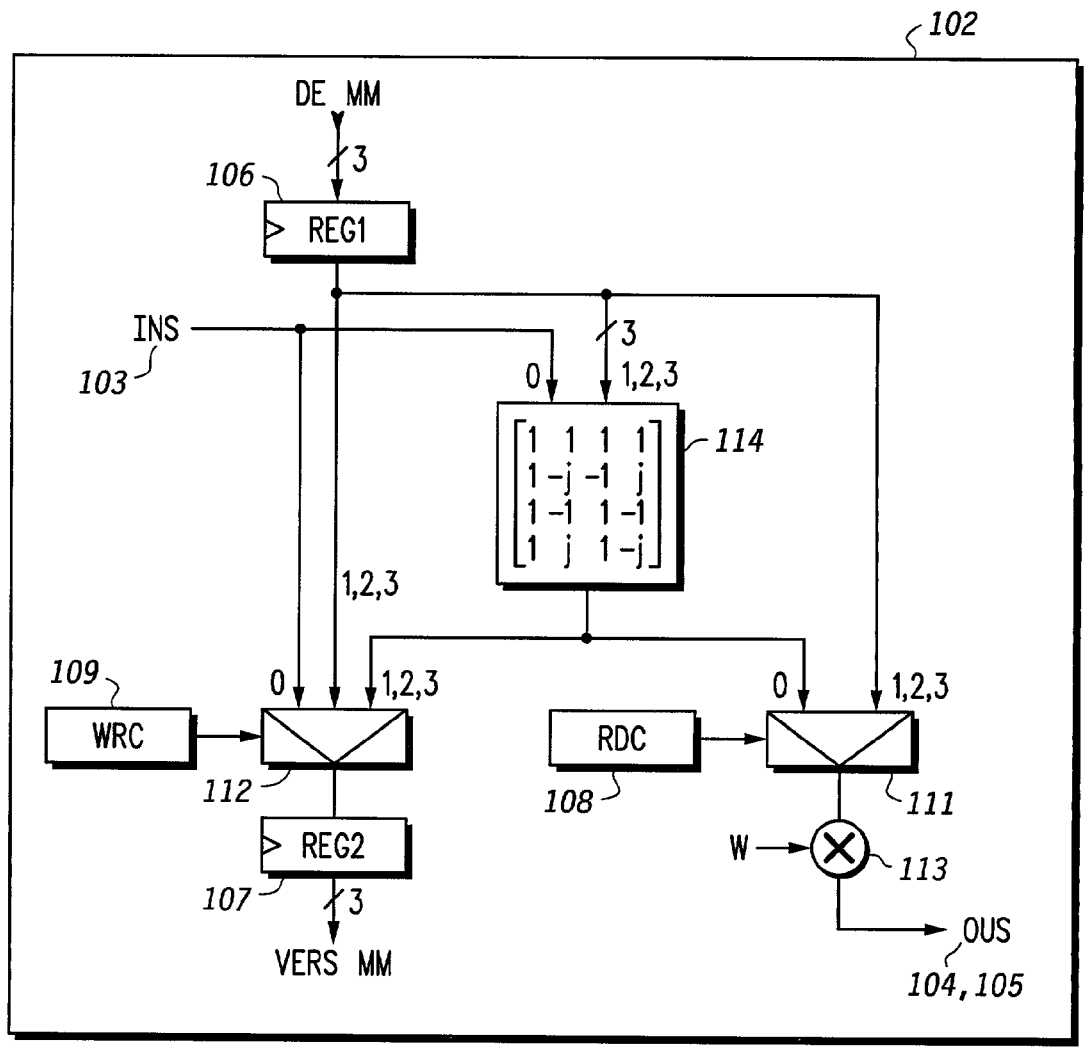
FIG. 1B is a logic diagram of a prior art processing stage for computing a Fourier transform.

The invention permits a small footprint (i.e. small VLSI size) system that can reconfigure its underlying hardware structure in a way that optimally implements a complex N-point parallel FFT butterfly stage, a complex division vector operation, or a complex multiplication vector operation. By doing so, the system may be configured in 802.11a mode for optimum OFDM-FFT processing and may be reconfigured in 802.11a or 802.11b mode for channel estimation or time domain filtering. Moreover, the system circumvents the need for traditional two's complement multiplication modules anywhere in the computation or data path stages through the incorporation of flexible CORDIC hardware module. This makes the implementation much more amenable to VLSI implementation. For IEEE 802.11a, the system may implement a 64-point complex FFT in 38 clock cycles; it also may perform point-wise multiplication or division of a complex vector by a complex vector in 51 clock cycles.

The FFT refers to the computationally efficient implementation of the DFT (Discrete Fourier Transform) by exploiting the following properties of $W_N$, a multiplying factor:

Symmetric Property: $W_N^{k+N/2} = -W_N^k$

Periodicity Property: $W_N^{k+N} = -W_N^k$

A direct computation of the DFT involves $N^2$ complex multiplications and $N*(N-1)$ complex additions. The DFT is defined as $$X_r = \sum_{k=0}^{N-1} x_k W_N^{rk} \quad \text{for } r = 0, 1, 2, \ldots, N-1$$

where $W_N = \exp(-j2\pi/N)$ $j = \sqrt{-1}$

The multiplying factors $W_N$ are known as "phase factors" or "twiddle factors." The Inverse Discrete Fourier Transform (IDFT) is defined as $$x_k = \frac{1}{N}\sum_{r=0}^{N-1} X_r W_N^{-rk} \quad \text{for } k = 0, 1, 2, \ldots, N-1$$

As the IDFT only differs from the DFT in sign of phase of $W_N$ and a scaling factor, for the purposes of discussion, only the DFT is used. However, all derivations below apply to IDFT with simple sign manipulation and scaling factor application.

Based on the equations for the DFT, the equation for a 64-point FFT, as used in the IEEE 802.11 protocol, may be written as $$X_r = \sum_{k=0}^{63} x_k W_N^{rk}$$

while the 64-point IFFT may be expressed as $$x_k = \frac{1}{64}\sum_{r=0}^{63} X_r W_N^{-rk}$$

where both $x_k$ and $X_r$ are, in general, complex vectors. The point-wise complex vector multiplication and division may be described as $\overline{Z} = \overline{X} * \overline{Y}$ $\overline{Z} = \overline{X}/\overline{Y}$ where $\overline{X}$, $\overline{Y}$, and $\overline{Z}$ are complex vectors of equal length. The point-wise vector multiplication and division performs $Z[i] = X[i] \times Y[i]$ and $Z[i] = X[i]/Y[i]$ for each element i of input vectors $\overline{X}$ and $\overline{Y}$.

The COordinate Rotation DIgital Computer (CORDIC) algorithm is an iterative procedure to compute various elementary functions. The CORDIC algorithm uses a single core routine to evaluate sines, cosines, multiplications, divisions, exponentials, logarithms, and transcendental functions. The CORDIC algorithm computes these functions with n-bits of accuracy in n iterations, where each iteration requires only a small number of shifts and additions. The basic CORDIC equations are as follows:

$x_{i+1} = x_i - m\sigma_i 2^{-S(m,i)} y_i$ $y_{i+1} = y_i + \sigma_i 2^{-S(m,i)} x_i$ $z_{i+1} = z_i - \sigma_i \alpha_{m,i}$ where m identifies circular (m=1), linear (m=0), or hyperbolic (m=-1) co-ordinate systems, and for each iteration i=0, 1, . . . , n.

$$S(m, i) = \begin{cases} 0, 1, 2, 3, 4, 5, \ldots & m = 1 \\ 1, 2, 3, 4, 5, 6, \ldots & m = 0 \\ 1, 2, 3, 4, 4, 5, \ldots & m = -1 \left(\text{repeat at } \frac{3^{i+2}-1}{2}\right) \end{cases}$$

$$\alpha_{m,i} = \begin{cases} a\tan(2^{-S(m,i)}) & m = 1 \\ 2^{-S(m,i)} & m = 0 \\ a\tan(2^{-S(m,i)}) & m = -1 \end{cases}$$

$$\sigma_i = \begin{cases} \text{sign}(z_i) & \text{for rotation} \\ -\text{sign}(x_i) \cdot \text{sign}(y_i) & \text{for vectoring} \end{cases}$$

The scale factor is given by $$K_m = \prod_{i=0}^{n} \sqrt{1 + m\sigma_i^2 2^{-2S(m,i)}} = \prod_{i=0}^{n} \sqrt{1 + m 2^{-2S(m,i)}}$$

It should be noted that this scale factor is fixed for each mode m, and thus can be pre-calculated. Furthermore, this scale factor may be approximated as sum-of-powers-of-2, thus simplifying its implementation to few adders and multiplexers instead of a multiplier.

Figure 2:
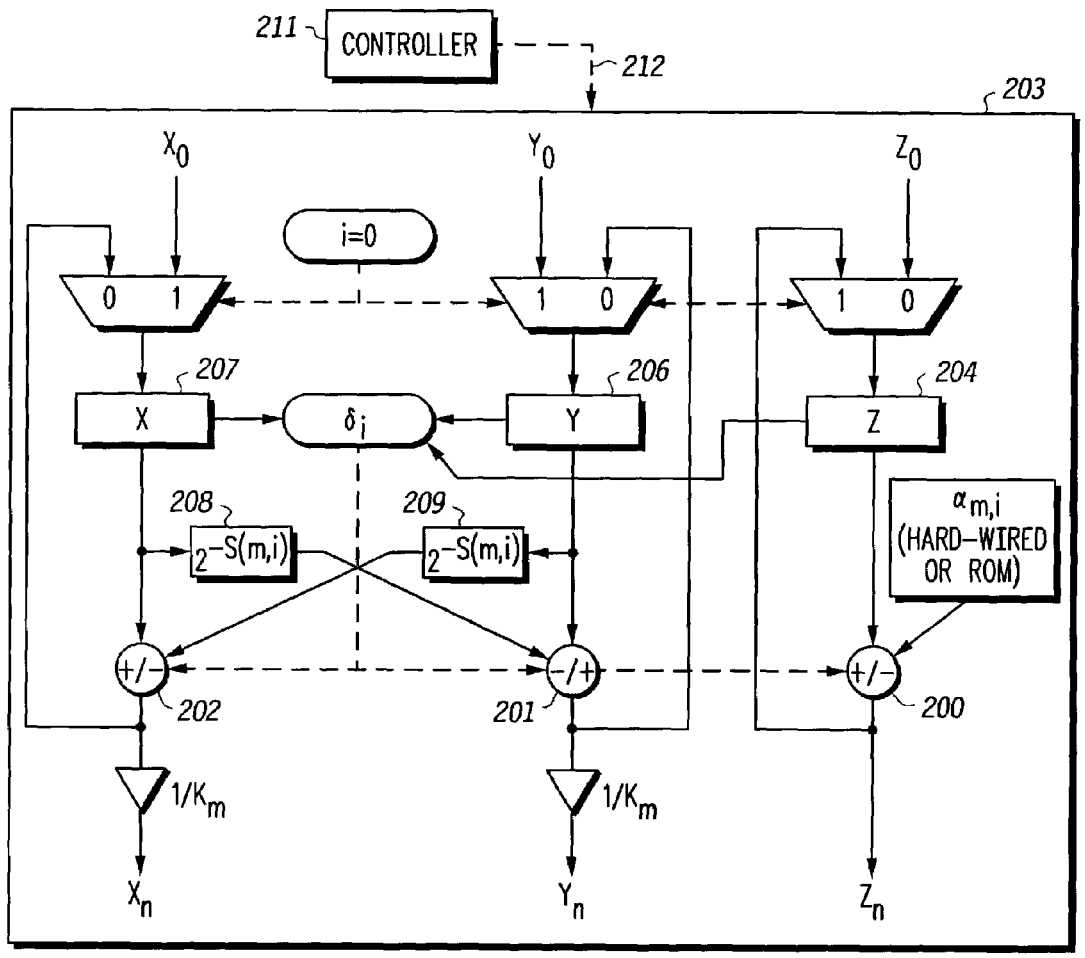
FIG. 2 is an example of a CORDIC implementation used in an embodiment of the present invention.

Table 1 shows the different elementary functions that can be evaluated by the CORDIC algorithm. The multiplication and division operations using CORDIC have a restriction in that their results must be bounded by the input word length. If fractional fixed-point format is assumed, the multiplication output is always fractional, and thus satisfies the criterion. For division operation, the two fractional inputs must be scaled such that the division result is guaranteed to be fractional. FIG. 2 shows a typical hardware implementation of CORDIC algorithms using adders/subtractors 200, 201, 202, shifters 208, 209, and registers 204, 206, 207 in a CORDIC core engine 203 under the signal 212 from the controller 211. Hardware reduction is significant due to elimination of multiplier and divider.

TABLE 1

| m | rotation $z_n \to 0$ | vectoring $y_n \to 0$ |
|---|---|---|
| 1 | $x_n = K_1(x_0 \cos z_0 - y_0 \sin z_0)$<br>$y_n = K_1(y_0 \cos z_0 + x_0 \sin z_0)$ | $x_n = K_1\sqrt{x_0^2 + y_0^2}$<br>$z_n = z_1 - \mathrm{atan}\left(\frac{y_0}{x_0}\right)$ |
| 0 | $x_n = x_0$<br>$y_n = y_0 + (x_0 \times z_0)$ | $x_n = x_0$<br>$z_n = z_0 + \left(\frac{y_0}{x_0}\right)$ |
| -1 | $x_n = K_{-1}(x_0 \cosh z_0 + y_0 \sinh z_0)$<br>$y_n = K_{-1}(y_0 \cosh z_0 + x_0 \sinh z_0)$ | $x_n = K_{-1}\sqrt{x_0^2 - y_0^2}$<br>$z_n = z_0 + \mathrm{atanh}\left(\frac{y_0}{x_0}\right)$ |

Figure 3A:
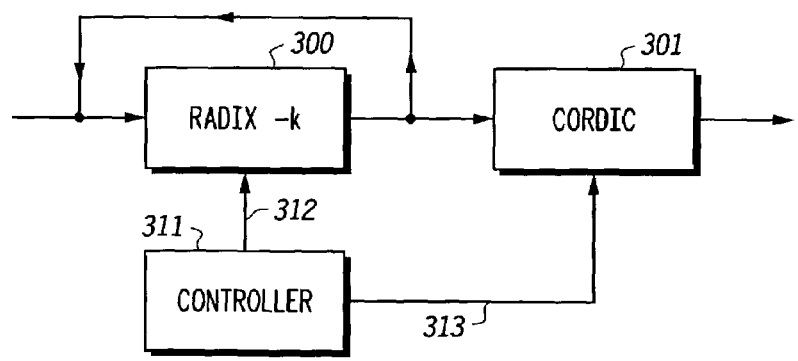
FIG. 3A is a logic diagram of an embodiment of the invention.
Figure 3B:
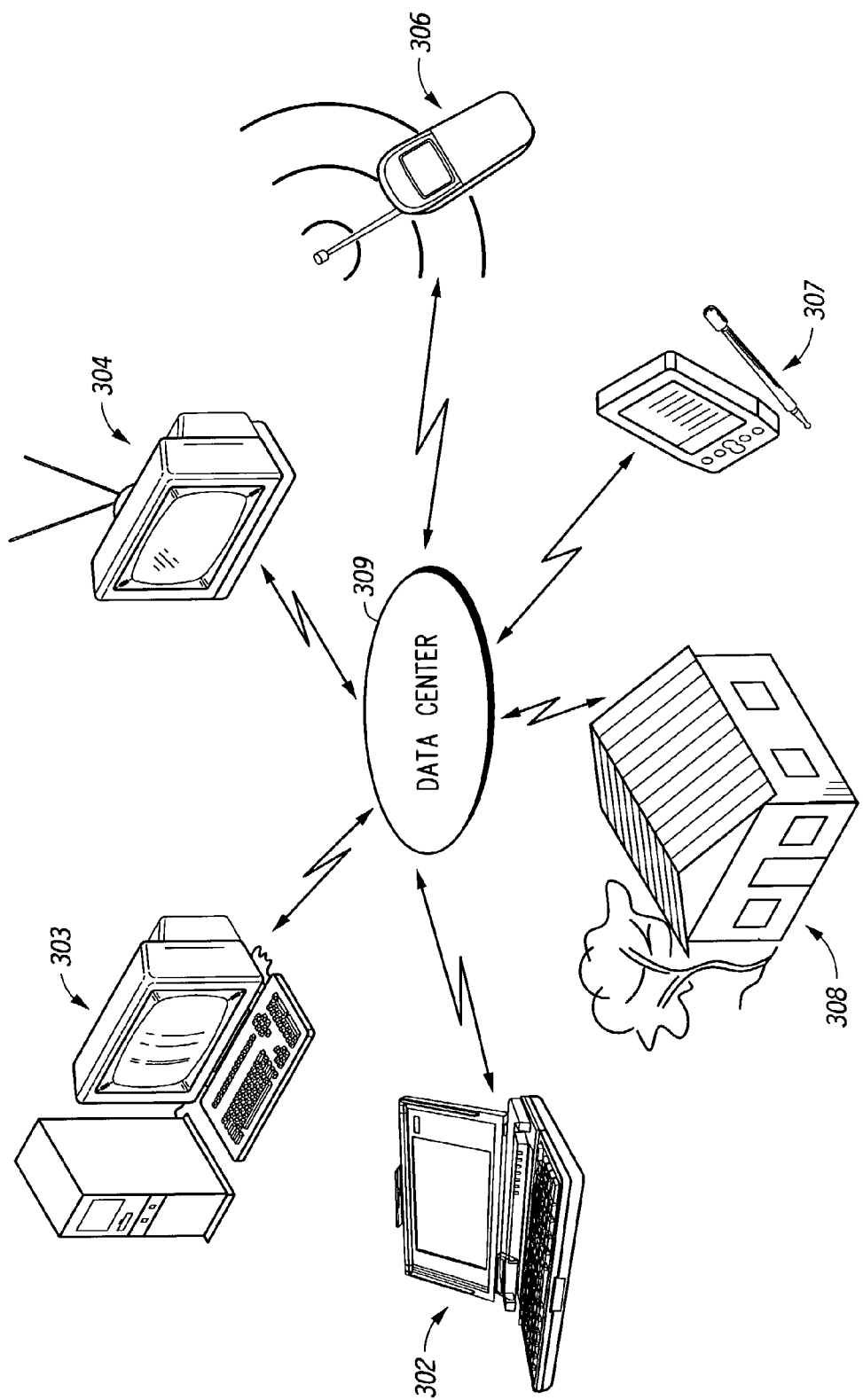
FIG. 3B is a wireless LAN incorporating the present invention.

Referring to FIGS. 3A and 3B, the invention may be used to implement an n-point FFT/IFFT using a radix-k FFT kernel 300 and CORDIC core engine 301 for complex rotations of twiddle factors. The embodiment of the invention shown in FIG. 3A may be used in various ways, as shown in the FIG. 3B, in relation to WLAN. The invention may be used for WLAN data transfers between data centers 309 and desktop computers 303, laptops 302, personal handheld device 307, cell phones 306, and tvs 304. The invention may also accommodate various protocol types besides the ones currently used, such as IEEE 802.11b.

As shown in FIG. 3A, the output of the radix-k kernel 300 is applied to the CORDIC core engine 301, and may also be fed back into the radix-k kernel 300 as needed for the calculation. The processes of the radix-k kernel 300 and the CORDIC module 301 are overseen by the controller 311 which sends control signals to the radix-k kernel 312 and control signals to the CORDIC module 313.

Figure 4:
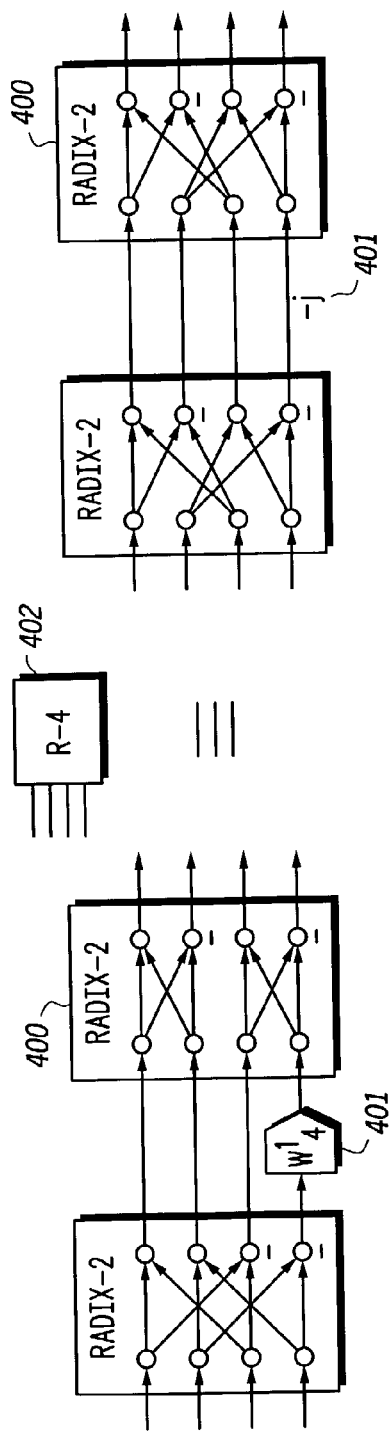
FIG. 4 is an example of a radix-4 FFT used in an embodiment of the present invention.

This radix-k kernel may be implemented using two radix-k/2 kernels and a twiddle factor 401 of $W_k^1 = -j$. For example, as shown in FIG. 4, two radix 2 kernels 400 may be used to construct a radix 4 kernel 402. The radix-2 stage may be re-arranged such that it uses the same interconnect geometry in both radix-2 stages, thus avoiding multiplexers. The interconnect geometries used may depend on the operation being performed by the radix 4 stages 402. The specific geometry or pattern used is not important if it is implemented in software. However, the interconnect geometry becomes more important when implemented in hardware.

The n-point FFT may use h stages of radix-k kernels. The same interconnect geometry is utilized for each radix-k FFT stage, thus allowing the sharing of hardware among all the stages. To determine the number of iterations or stages needed when implementing a n-point FFT using a radix-k kernel, the following equation is used:

Number of Iterations = $\log_k(n)$

The twiddle factors required between the two radix-k stages are computed using the CORDIC algorithm using Rotation mode in the Circular co-ordinate system, as shown in Table 1. The twiddle factors for FFT and IFFT differ only in sign of their respective phases.

This n-point FFT/IFFT structure of the present invention may be modified to incorporate n/2-element complex vector point-wise multiplication or division, which is defined as follows $$\overline{Z} = \overline{X}.*\overline{Y}$$

$$\overline{Z} = \overline{X}./\overline{Y}$$

or $Z[i] = X[i] \times Y[i]$ for $i = 0, 1, 2, \ldots, n-1$ $Z[i] = X[i]/Y[i]$ for $i = 0, 1, 2, \ldots, n-1$ This is possible because the same CORDIC core engine for twiddle factors may also be used to compute multiplication and division of two real numbers, as shown in Table 1 (above) using the Rotation/Vectoring mode in the Linear co-ordinate system. To calculate complex number multiplication/division, complex inputs (real and imaginary) are first converted into their polar co-ordinates (magnitude and phase) using the CORDIC in Vectoring mode in Circular co-ordinate system. The multiplication and/or division of input magnitudes is performed using Rotation/Vectoring mode in Linear co-ordinate system of CORDIC. The input phases are added or subtracted for multiplication and division respectively by using CORDIC adders/subtractors. Finally, the resultant magnitude and phase are converted into real and imaginary components of output.

Figure 5:
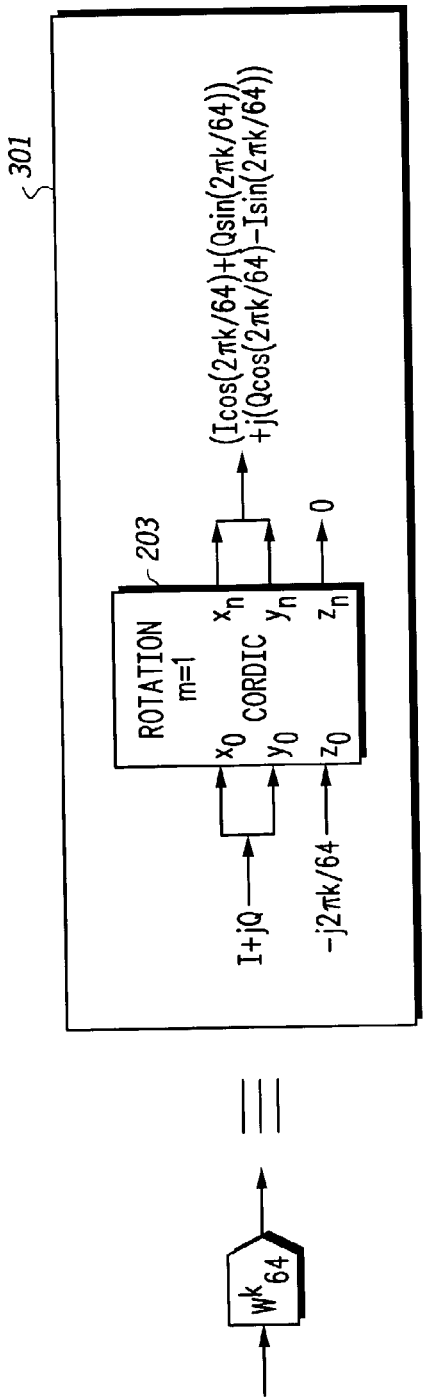
FIG. 5 is a reconfigurable operation kernel for a FFT/IFFT Twiddle Factor using a CORDIC engine, in accordance with an embodiment of the invention.

FIGS. 5–7 show the different modes of CORDIC engine used in FFT/IFFT twiddle factor multiplication and a complex multiplication/division, in accordance with the present invention. FIG. 5 is twiddle factor multiplication using the CORDIC core engine 203. FIG. 6 is an embodiment of complex multiplication using an adder/subtractor 600 and the CORDIC core engines 203A, 203B, 203C and 203D. FIG. 7 is an embodiment of complex division using the adder/subtractor 600 and the CORDIC core engines 203A, 203B, 203C and 203D.

In the alternative, the complex multiplication may also be carried out directly in cartesian co-ordinates by $(I_1 + jQ_1) \times (I_2 + jQ_2) = (I_1I_2 - Q_1Q_2) + j(I_1Q_2 + I_2Q_1)$ which involves 4 real multiplications (using CORDIC in Rotation mode in Linear co-ordinate system) and 2 real adders. However, the multiplication in polar co-ordinates is used here as it's very similar to division operation, thus permitting the reuse of the same control logic.

The terms a or an, as used herein, are defined as one or more than one. The term plurality, as used herein, is defined as two or more than two. The term another, as used herein, is defined as at least a second or more. The phrase any integer derivable therein, as used herein, is defined as an integer between the corresponding numbers recited in the specification, and the phrase any range derivable therein is defined as any range within such corresponding numbers. The terms n and k are any positive integer.

EXAMPLES

Specific embodiments of the invention will now be further described by the following, nonlimiting examples which will serve to illustrate in some detail various features and advantages of the present invention. The following examples are included to facilitate an understanding of ways in which the invention may be practiced. It should be appreciated that the examples which follow represent embodiments discovered to function well in the practice of the invention, and thus can be considered to constitute preferred modes for the practice of the invention.

Example 1

For IEEE 802.11a, a system can implement a 64-point complex FFT in 38 clock cycles; it also can perform point-wise multiplication of a complex vector by a complex vector in 51 clock cycles.

For IEEE 802.11a, the required length of a FFT/IFFT transform is 64. One embodiment of the invention implements this 64-point FFT/IFFT using a radix-4 FFT kernel and CORDIC core engine for complex rotations of twiddle factors. The radix-4 FFT kernel performs the following operation:

$$\begin{bmatrix} X(0) \\ X(1) \\ X(2) \\ X(3) \end{bmatrix} = \begin{bmatrix} 1 & 1 & 1 & 1 \\ 1 & -j & -1 & 1 \\ 1 & -1 & 1 & -1 \\ 1 & j & -1 & -1 \end{bmatrix} \begin{bmatrix} x(0) \\ x(1) \\ x(2) \\ x(3) \end{bmatrix}$$

This radix-4 kernel may be implemented using two radix-2 kernels 400 and a trivial twiddle factor 401 of $W_4^1 = -j$, as shown, for example, in FIG. 4. The radix-2 stage is re-arranged such that it uses the same interconnect geometry in both radix-2 stages, thus avoiding multiplexers. The interconnect geometries used may depend on the operation being performed by the radix 2 stages.

Figure 8:
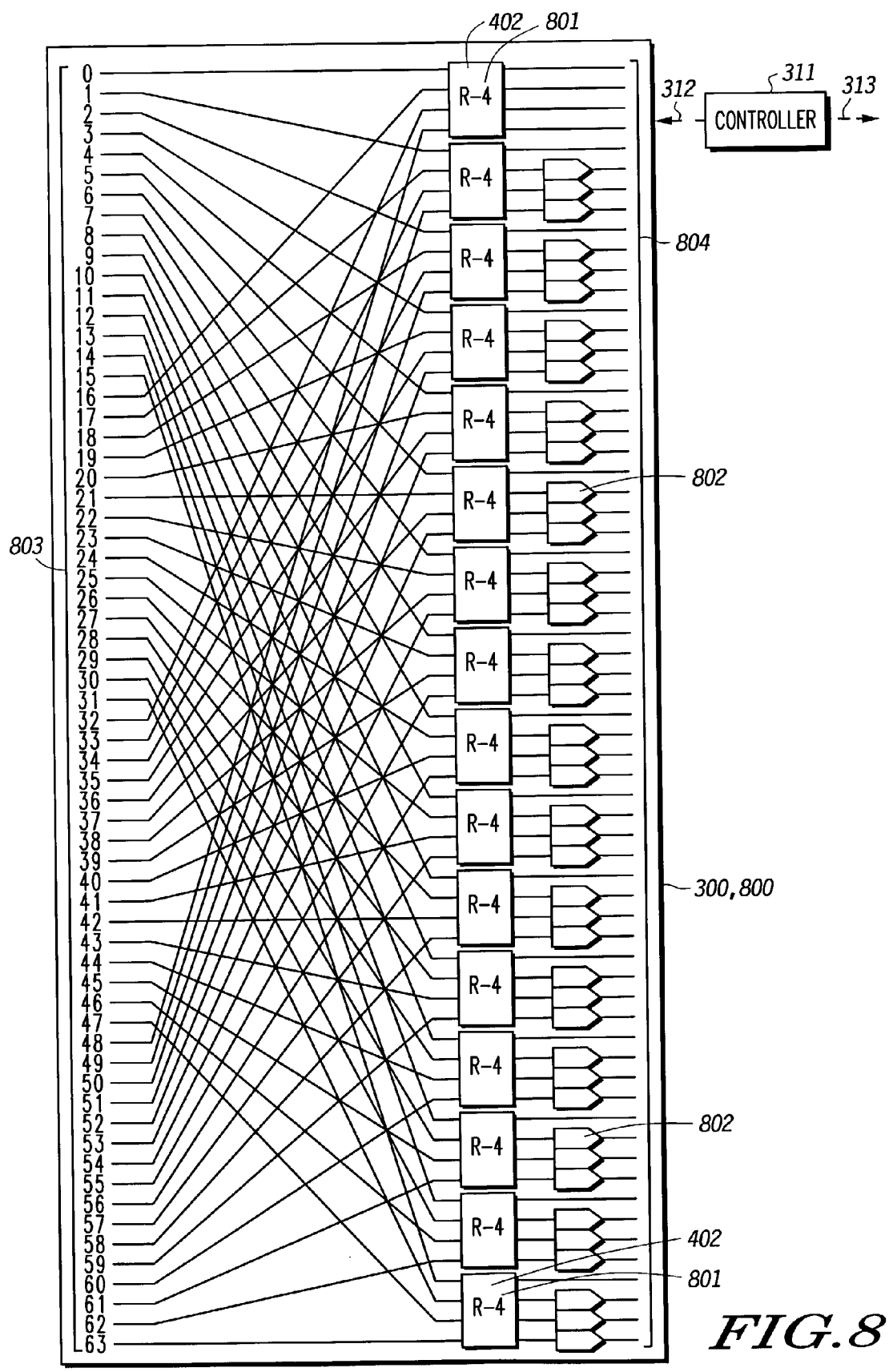
FIG. 8 is an example of a 64-point FFT using radix-4 used in an embodiment of the present invention.

The 64-point FFT may use three identical stages of radix-4 kernels. An embodiment of one such radix-4 kernel is shown in FIG. 8. In accordance with the present invention, since the same interconnect geometry is utilized for each radix-4 FFT stage, this allows the sharing of hardware among all the three stages. In one embodiment of the invention, the actual hardware implementation may only incorporate a single stage 800 of radix-4 kernels, comprised of 16 radix-4 elements 402, which receives in the input signal 803 and feeds back the output 804 to the input 803, passing through the twiddle factor 802, and computes the 64-point FFT/IFFT in 3 sequential iterations. In operation, under control of controller 311, the output 804 is fed back to the input 803 for two iterations, and is sampled every $3^{rd}$ time to obtain the results of the 64-point FFT/IIFFT.

This 64-point FFT/IFFT structure may be modified to incorporate 32-element complex vector point-wise multiplication or division, which is defined as follows $\overline{Z} = \overline{X} \cdot \overline{Y}$ $\overline{Z} = \overline{X} / \overline{Y}$ or $Z[i] = X[i] \times Y[i]$ for $i = 0, 1, 2, \ldots, 31$ $Z[i] = X[i] / Y[i]$ for $i = 0, 1, 2, \ldots, 31$ Referring now to FIGS. 9A–9D, disclosed is an embodiment of the invention for the reconfigurable combined complex vector-FFT/IFFT and vector-multiplier/divider module. The architecture may be reconfigured (i.e. with multiplexers 913 under control of controller 311) to implement 64-point complex FFT/IFFT, 32-point complex vector multiplication, or 32-point complex vector division depending upon the particular mathematical operation desired at any particular time. The reconfiguration may be done by controller 311 during the receiving and multiplexing of the incoming signals, where it is controlled by software. This reconfiguration may also take place each time a signal is received as many microprocessor chips have clock rates faster than that of the transmission rate. Reconfiguration may also be implemented, as a state machine in a microprocessor chip as variables such as delays and the number of bits transmitted are known.

Figure 9A:
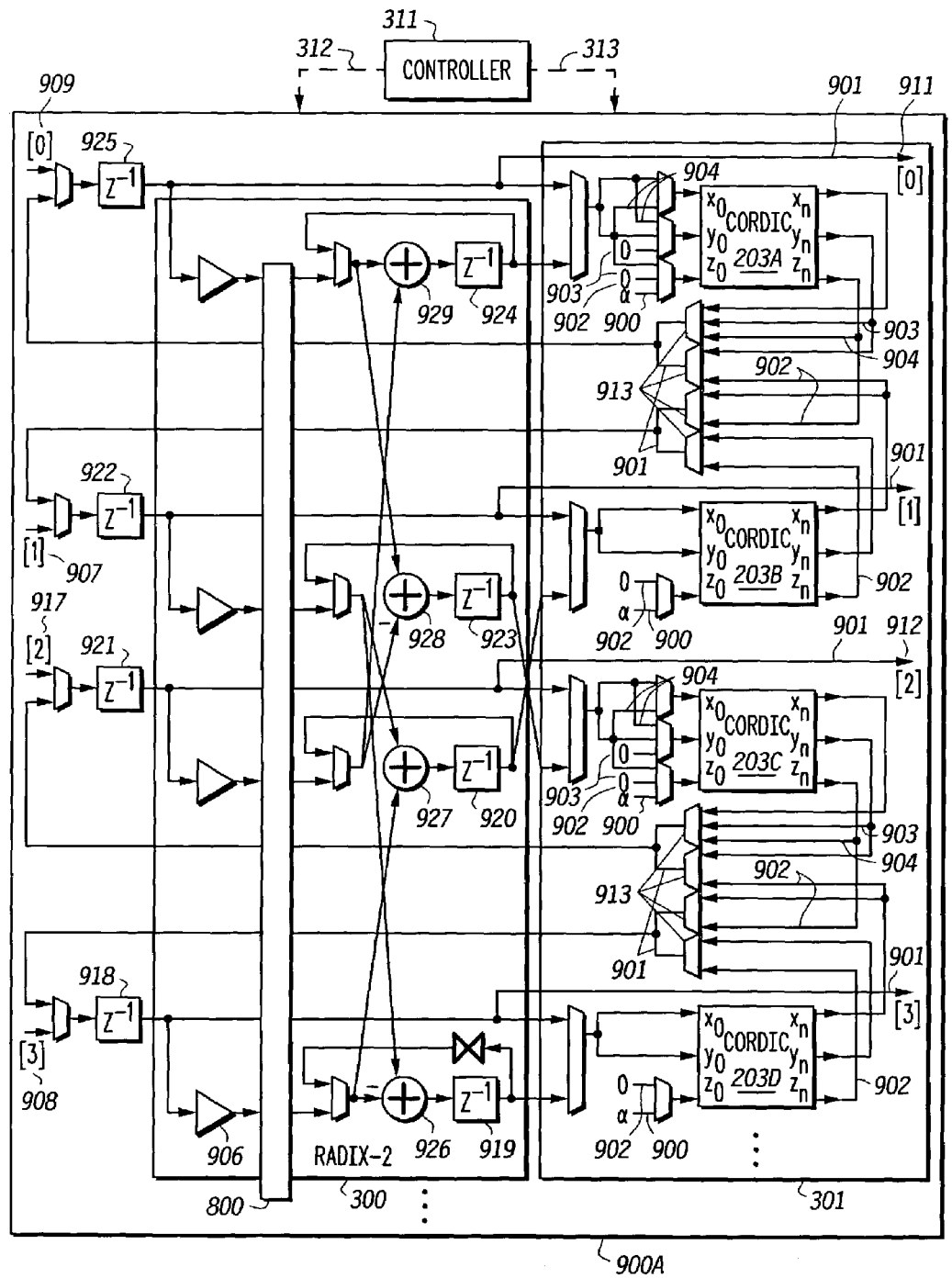
FIGS. 9A–9D show architectures of Vector-FFT/1 TFFT and Vector-Multiplier/Divider for a 64 point FFT, in accordance with an embodiment of the invention.
Figure 9B:
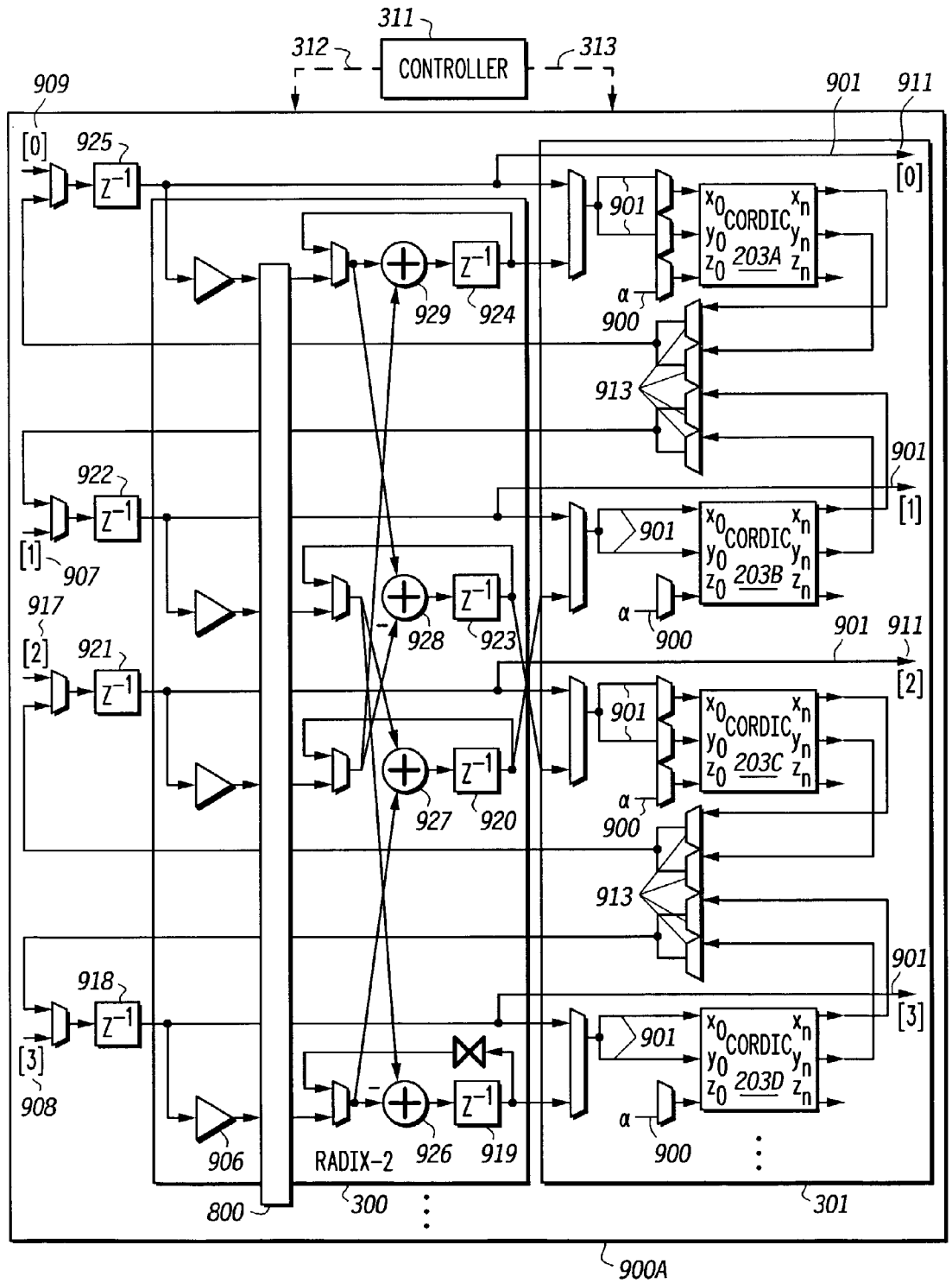
Figure 9C:
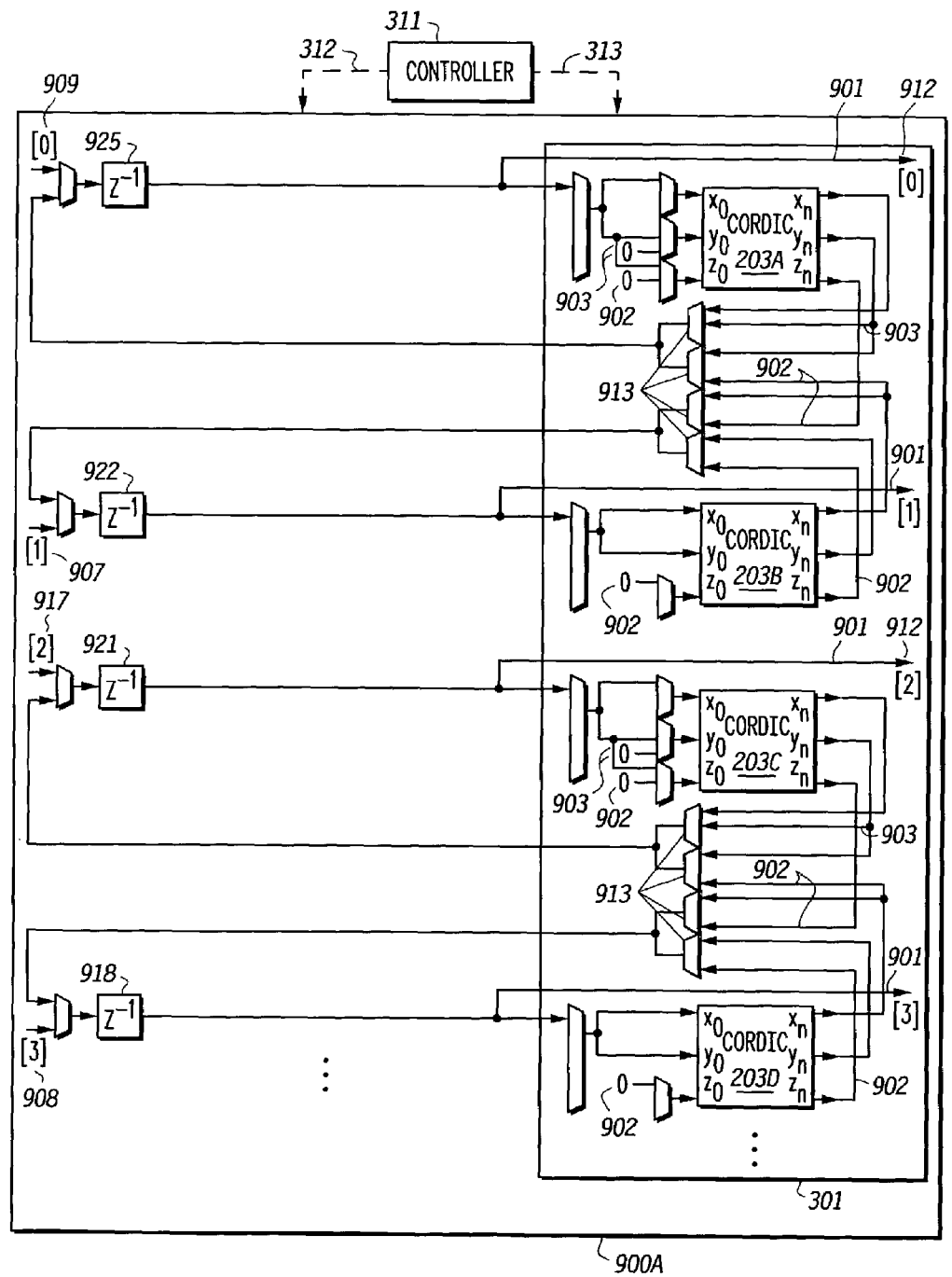
Figure 9D:
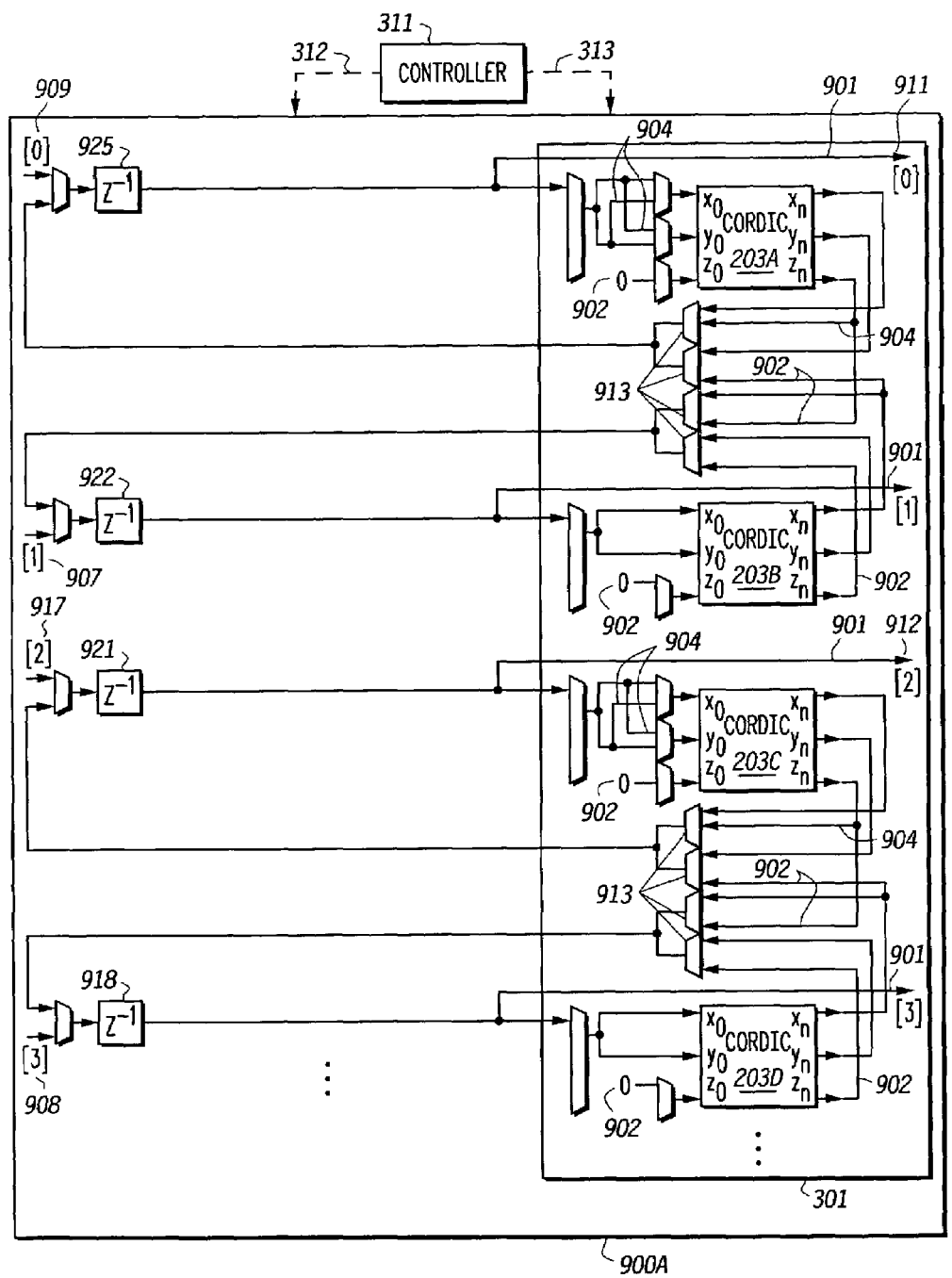

The lines in FIGS. 9A–9D indicate the signal flow in FFT/IFFT 900, multiplication 903, division 904, and all modes 901, as presented in more detail below with reference to FIGS. 9B–D. Lines also indicate signal flow for paths 902 shared by multiplication and division, and paths 900 shared by all modes. FIG. 9A shows signal paths used for all of the modes. FIG. 9B shows only the signal pathways used for computing FFT/IFFT, FIG. 9C shows only the signal pathways used for multiplication mode, and FIG. 9D shows only the signal pathways used for division mode. FIGS. 9C and 9D do not explicitly show the radix 4 stage 800 shown in FIGS. 9A and 8 and the complex storage registers 918–925, as both figures have been simplified to show only one example of the signal pathways used for these functions. In actual operation, signal processing may pass through the radix 4 stage 800.

Only a 4-point vector slice out of 64-point vector is shown in FIGS. 9A–9D. However, the remaining fifteen 4-point slices are identical to the one shown. For clarity, the control signals for multiplexers 913 that are used to reconfigure the circuit to perform the different individual functions are not shown as they change constantly. However, they can be derived for multiplication, division, and the twiddle factor based upon the input and output connections between each CORDIC module 203A–203D as shown in FIGS. 6 and 7.

In FFT/IFFT mode, the architecture of FIGS. 9A–9D uses a 64-point complex vector input (shown using thick lines 900, which also denotes signal pathways used in all modes) and outputs a 64-point complex FFT/IFFT vector. In vector multiplication and division mode 902, the two 32-point complex vector inputs $\overline{X}$ and $\overline{Y}$ are assumed to be on even 909, 917 and odd 907, 908 input indices respectively, and the resulting 32-point complex multiplier/divider vector is outputted on all even output indices 911, 912. It should be noted that in the FFT/IFFT mode of operation, a radix-2 kernel is used to construct a radix-4 kernel, consistent with the earlier discussion with reference to FIG. 4. The gain 906 of 0.5 is used in radix-2 300 to scale both FFT and IFFT equally by ⅛, instead of scaling only the IFFT by 1/64.

All of the signals received at the inputs 907–909, 917 proceed through the radix 4 stage 800 shown in FIG. 8 and into complex storage registers 918–925 and into the CORDIC module 301 for calculations. The outputs of the CORDIC engines are then fed back through multiplexers 913 to the input indices and through the complex storage registers 918, 921, 922, 925 before re-entering the radix-4 stage 800. The CORDIC engines 914 shown could be implemented in the manners shown earlier to calculate a twiddle factor (FIG. 5), to multiply (FIG. 6), or to divide (FIG. 7).

TABLE 2

| | Number of clock cycles | |
|---|---|---|
| Operations | For $I_c$ CORDIC iterations | For $I_c = 16$ |
| FFT or IFFT | $6 + 2I_c$ | 38 |
| Multiplication | $3 + 3I_c$ | 51 |
| Division | $3 + 3I_c$ | 51 |

Table 2 shows the number of clock cycles required to compute vector FFT/IFFT, multiplication and division functions, for IC CORDIC iterations in accordance with the present invention. To achieve W-bit accuracy at the output, one needs to perform $(W+\log_2 W)$ iterations of the CORDIC algorithm.

As shown in FIG. 2 and FIGS. 9A–9D, the architecture may have a small footprint or gate-area with only 64×7=448 real registers (each of the 64 units having 3 from CORDIC hardware 204, 206–207 and 2-complex storage registers 918–925), and 64×5=330 real adders 916 (each of the 64 units having 3 from CORDIC hardware 200–202 and 1-complex adder from radix-2 926–929).

Example 2

Another embodiment of the invention can solve a 32-point FFT/IFFT using a radix-2 FFT kernel and CORDIC core engine for complex rotations of twiddle factors.

Figure 10:
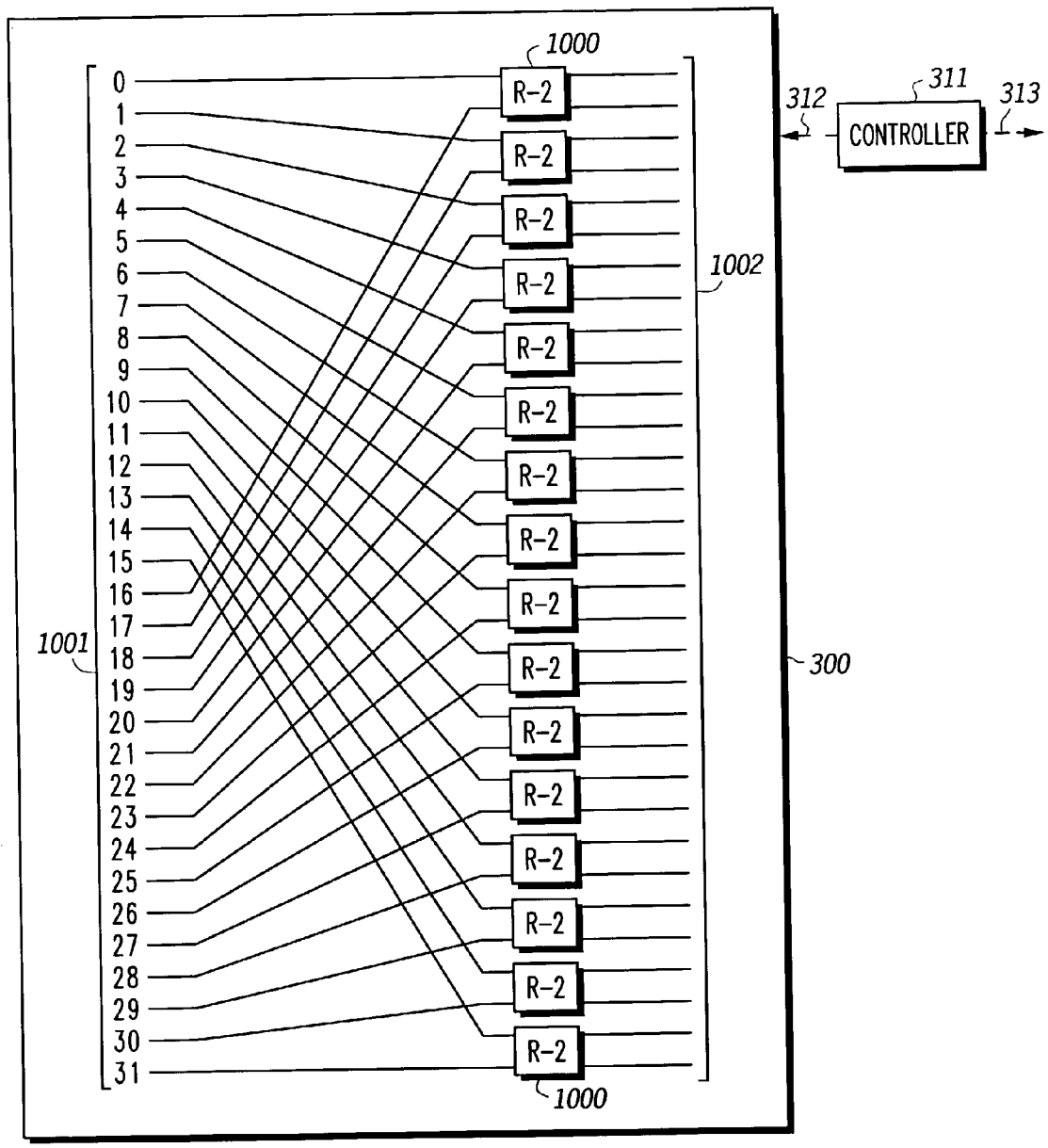
FIG. 10 is an architecture of Vector-FFT/IFFT and Vector-Multiplier/Divider for a 32 point FFT, in accordance with an embodiment of the invention

The 32-point FFT may use five stages of radix-2 kernels 1000 as shown in FIG. 10. The same interconnect geometry is utilized for each radix-2 FFT stage, thus allowing the sharing of hardware among all of the five stages. In one embodiment of the invention, the actual hardware implementation may only incorporate a single stage of radix-2 kernels, comprising of 16 radix-2 elements (kernels) 1000, which feeds its output 1002 back to itself as an input 1001, and computes the 32-point FFT/IFFT in 5 sequential iterations. The output 1002 is sampled every $5^{th}$ time to obtain the necessary results.

This 32-point FFT/IFFT structure may be modified to incorporate 16-element complex vector point-wise multiplication or division, which is defined as follows $\overline{Z} = \overline{X} \cdot \ast \overline{Y}$ $\overline{Z} = \overline{X} \cdot / \overline{Y}$ or $Z[i] = X[i] \times Y[i]$ for $i = 0, 1, 2, \ldots, 15$ $Z[i] = X[i]/Y[i]$ for $i = 0, 1, 2, \ldots, 15$ The architecture for the current embodiment of the invention may be reconfigured to implement a 32-point complex FFT/IFFT, 16-point complex vector multiplication, or 16-point complex vector division. The reconfiguration may be done during the receiving and multiplexing of the incoming signals, where it is controlled by software. This reconfiguration may also take place each time a signal is received as many microprocessor chips have clock rates faster than that of the transmission rate. Reconfiguration may also be implemented in the form of a state machine in a microprocessor chip as variables such as delays and the number of bits transmitted are known.

Example 3

Another embodiment of the invention can solve a 16-point FFT/IFFT using a radix-4 FFT kernel and CORDIC core engine for complex rotations of twiddle factors.

Figure 11:
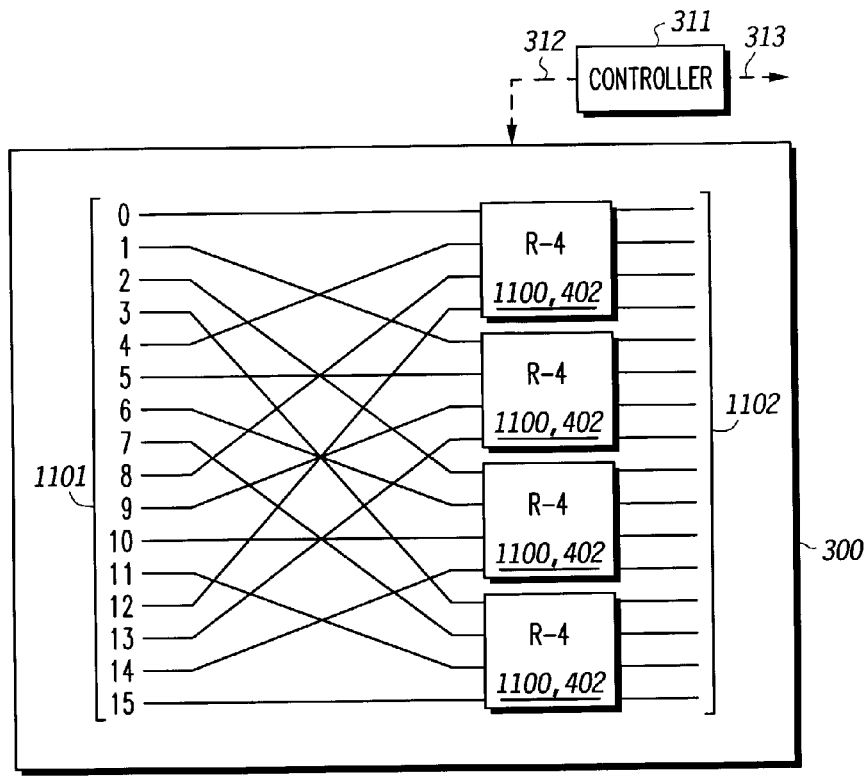
FIG. 11 is an architecture of Vector-FFT/IFFT and Vector-Multiplier/Divider for a 16 point FFT, in accordance with an embodiment of the invention

The 16-point FFT may use 2 stages of radix-4 kernels 1100 as shown in FIG. 11. The same interconnect geometry is utilized for each radix-4 FFT stage, thus allowing the sharing of hardware among all of the five stages. In one embodiment of the invention, the actual hardware implementation may only incorporate a single stage of radix-4 kernels, comprising of 4 radix-4 elements 1100, which feeds its output 1102 back to itself as an input 1101, and computes the 16-point FFT/IFFT in 2 sequential iterations. The output 1102 is sampled every $2^{nd}$ time to obtain the necessary results.

This 16-point FFT/IFFT structure may be modified to incorporate 8-element complex vector point-wise multiplication or division, which is defined as follows $\overline{Z} = \overline{X} \cdot \ast \overline{Y}$ $\overline{Z} = \overline{X} \cdot / \overline{Y}$ or $Z[i] = X[i] \times Y[i]$ for $i = 0, 1, 2, \ldots, 7$ $Z[i] = X[i]/Y[i]$ for $i = 0, 1, 2, \ldots, 7$ The architecture for the current embodiment of the invention may be reconfigured to implement a 16-point complex FFT/IFFT, 8-point complex vector multiplication, or 8-point complex vector division. The reconfiguration may be done during the receiving and multiplexing of the incoming signals, where it is controlled by software. This reconfiguration may also take place each time a signal is received as many microprocessor chips have clock rates faster than that of the transmission rate. Reconfiguration may also be implemented in the form of a state machine in a microprocessor chip as variables such as delays and the number of bits transmitted are known.

Practical Applications of the Invention

Figure 12:
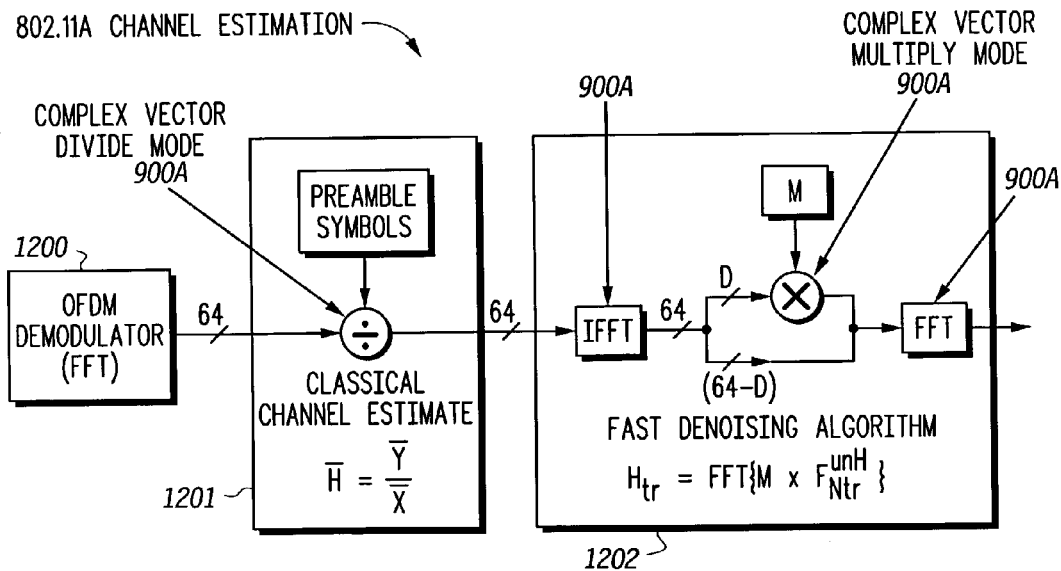
FIG. 12 is an embodiment of the invention as used for IEEE 802.11a channel estimation.

A practical application of the invention that has value within the technological arts is that it enables mapping of generic algorithms used in digital communications and wireless modems. One embodiment of the invention, as shown in FIG. 12, may 20 also use a FFT from an OFDM demodulator 1200 to map many of the major computational needs of WLAN IEEE 802.11a and 802.11b protocols for modulation/demodulation and channel estimation. The channel estimation 1201 portion requires complex division and FFT/IFFT, while the denoising algorithm 1202 that follows the channel estimation uses complex multiplication and FFT/IFFT. Each of these blocks 1201 and 1202 may be implemented using the same reconfigurable hardware and may use an embodiment of the invention, 900A, to process the incoming data signal and to perform the different required mathematical operations (FFT, IFFT, multiplication, division) at different times to perform the 802.11 a channel estimation function shown in FIG. 12. The invention may be implemented in various types of digital signal processing, including those featuring FFT/IFFT or complex multiplication and division operations. There are virtually innumerable uses for the invention, all of which need not be detailed here.

ADVANTAGES OF THE INVENTION

A reconfigurable vector-FFT/IFFT and vector-multiplier/divider with a VLSI micro-footprint, representing an embodiment of the invention, is cost effective and advantageous for at least the following reasons. One such embodiment of the invention is reconfigurable so that different operations are based on the same underlying CORDIC kernel. An embodiment of the invention does not utilize multipliers or dividers, thus reducing the area it requires and costing less to make.

The invention enables improved bit-level accuracy for traditionally, computationally intensive functions, such as division and FFT. The invention also allows for WLAN 802.11 as well as other possible forms of FFT/IFFT and complex number operations. The invention improves quality and/or reduces costs compared to previous approaches.

REFERENCES

Each of the reference listed are hereby incorporated by reference in their entirety.
1. Despain, Alvin M., "Fourier Transform Computers Using CORDIC Iterations", *IEEE Transactions on Computers*, Vol. C-23, No. 10, Oct. 1974.
2. Despain, Alvin M., "Very Fast Fourier Transform Algorithms Hardware for Implementation", *IEEE Transactions on Computers*, Vol. C-28, No. 5, May 1979.
3. P. Jarvis, "Implementing Cordic Algorithms", Dr. Dobb's Journal, October 1990.
4. R. Sarmiento and K. Eshraghian, "Implementation of a CORDIC Processor for CFFT Computation in Gallium Arsenide Technology", *EDAC—The European Conference on Design Automation, ETC—European Test Conference, EUROASIC—The European Event in ASIC Design, Proceedings*, pp. 238–244, 1994.
5. S. Wang and E. E. Swartzlander Jr., "Merged CORDIC Algorithm", Int. Symp. on Circuits and Systems, ISCAS'95, vol. 3, pp. 1988–1991, 1995.
6. J. S. Walther, "A Unified Algorithm for Elementary Functions", 1971 Spring Joint Computing Conference, AFIPS Proc., vol. 38, Montvale, N.J., pp. 379–385, 1971.

What is claimed is:

1. A reconfigurable mathematical operation circuit, comprising:
   a coordinate rotation digital computer (CORDIC) circuit having a plurality of reconfigurable components for performing a respective plurality of distinct mathematical functions; and
   a controller for controlling a configuration of said CORDIC circuit, whereby, in a first configuration said CORDIC circuit performs a fast Fourier transform function, in a second configuration said CORDIC circuit performs a multiplier function, and in a third configuration said CORDIC circuit performs a divider function.

2. The reconfigurable mathematical operation circuit of claim 1, said first configuration including a radix-N fast Fourier transform circuit and a plurality of registers configured to perform iteratively a fast Fourier transform function.

3. The reconfigurable mathematical operation circuit of claim 2, said first configuration including a radix-4 fast Fourier transform circuit.

4. The reconfigurable mathematical operation circuit of claim 1, said second configuration including a vector multiplier circuit configured to perform a vector multiplication function.

5. The reconfigurable mathematical operation circuit of claim 1, said third configuration including a vector divider circuit configured to perform a vector division function.

6. A reconfigurable WLAN IEEE 802.11 receiver circuit, comprising:
   reconfigurable circuitry including CORDIC circuit components configurable to form a fast Fourier transform WLAN signal demodulation circuit, a multiplier-based WLAN channel equalization circuit, and a divider-based WLAN channel estimation circuit; and
   a controller for controlling a configuration of said circuit components to form a WLAN IEEE 802.11 receiver.

7. The reconfigurable WLAN IEEE 802.11 receiver circuit of claim 6, said fast Fourier transform WLAN signal demodulation circuit including a plurality of registers connected to the output of a plurality of radix-4 FFT stages.

8. The reconfigurable WLAN IEEE 802.11 receiver circuit of claim 7, each of said plurality of radix-4 FFT stages comprising two radix-2 FFT stages.

9. A method of operating a reconfigurable circuit to condition a WLAN signal, comprising:
   providing a CORDIC circuit comprising a reconfigurable circuit having multiple distinct circuit configurations with respective distinct operating modes;
   configuring said reconfigurable circuit in a first configuration to perform a fast Fourier transform function;
   configuring said reconfigurable circuit in a second configuration to perform a multiplier function; and
   configuring said reconfigurable circuit in a third configuration to perform a divider function.

10. The method of operating a reconfigurable circuit to condition a WLAN signal of claim 9, said fast Fourier transform function demodulating said WLAN signal.

11. A method of operating a reconfigurable circuit to condition a WLAN signal of claim 9, said multiplier function equalizing a channel of said WLAN signal.

12. A method of operating a reconfigurable circuit to condition a WLAN signal of claim 9, said divider function estimating a channel of said WLAN signal.

13. A method of operating a reconfigurable circuit to condition a WLAN signal of claim 9, said fast Fourier transform function comprising, iteratively determining a fast Fourier transform of said WLAN signal.

* * * * *

UNITED STATES PATENT AND TRADEMARK OFFICE
CERTIFICATE OF CORRECTION

PATENT NO.         : 7,082,451 B2
APPLICATION NO. : 10/237465
DATED              : July 25, 2006
INVENTOR(S)        : Kulkarni et al.

It is certified that error appears in the above-identified patent and that said Letters Patent is hereby corrected as shown below:

In claim 1, column 11, line 52, delete "perfonning" and insert --performing-- therefor.

Signed and Sealed this

Seventh Day of November, 2006

JON W. DUDAS
*Director of the United States Patent and Trademark Office*